United States Patent
Kim et al.

(10) Patent No.: US 6,738,417 B1
(45) Date of Patent: May 18, 2004

(54) METHOD AND APPARATUS FOR BIDIRECTIONAL DATA TRANSFER BETWEEN A DIGITAL DISPLAY AND A COMPUTER

(75) Inventors: Sungjoon Kim, Seoul (KR); Deog-Kyoon Jeong, Sungnam (KR); David D. Lee, Palo Alto, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 0 days.

(21) Appl. No.: 09/393,849

(22) Filed: Sep. 9, 1999

Related U.S. Application Data
(60) Provisional application No. 60/100,057, filed on Sep. 10, 1998.

(51) Int. Cl.[7] .............................. H04B 1/38; H04L 5/16
(52) U.S. Cl. ...................................... 375/220; 375/221
(58) Field of Search .............................. 375/221, 296, 375/220, 222; 705/305; 341/101; 326/82; 370/284; 345/123

(56) References Cited

U.S. PATENT DOCUMENTS

| | | | |
|---|---|---|---|
| 3,691,295 A | 9/1972 | Fisk ........................... 178/58 |
| 4,928,273 A | * 5/1990 | Protopapas ................. 370/458 |
| 5,361,376 A | * 11/1994 | Cummins et al. ........... 710/305 |
| 5,604,450 A | * 2/1997 | Borkar et al. ................ 326/82 |
| 5,705,947 A | 1/1998 | Jeong ......................... 327/270 |
| 5,801,549 A | 9/1998 | Cao et al. ..................... 326/83 |
| 5,815,041 A | 9/1998 | Lee et al. ....................... 331/8 |
| 5,825,824 A | 10/1998 | Lee et al. .................... 375/292 |
| 5,835,498 A | 11/1998 | Kim et al. ................... 370/537 |
| 5,905,769 A | 5/1999 | Lee et al. .................... 375/376 |
| 5,955,929 A | 9/1999 | Moon et al. .................. 331/57 |
| 5,969,552 A | 10/1999 | Lee et al. .................... 327/158 |
| 5,974,464 A | 10/1999 | Shin et al. ................... 709/231 |
| 5,999,571 A | 12/1999 | Shin et al. ................... 375/292 |
| 6,107,946 A | * 8/2000 | Jeong ......................... 341/101 |

FOREIGN PATENT DOCUMENTS

| | | | |
|---|---|---|---|
| EP | 0 692 760 A2 | 1/1996 | ............. G06F/3/14 |
| EP | 0 692 760 A3 | 5/1996 | ............. G06F/3/14 |
| EP | 0 760 499 A1 | 3/1997 | ............. G06F/3/00 |
| WO | WO 97/42731 | 11/1997 | ........... H04L/7/033 |

* cited by examiner

Primary Examiner—Stephen Chin
Assistant Examiner—Curtis Odom
(74) Attorney, Agent, or Firm—Perkins Coie LLP

(57) ABSTRACT

A new scheme to transfer bidirectional data streams between a digital display and a computer is disclosed. This bidirectional data transfer can make several I/O devices attach to a display. Existing digital display interfaces are usually unidirectional from a computing to a display. Due to the nature of the existing clocking scheme, backward data transfer from the display side to the computer requires a backward clock. This invention discloses a scheme to send data bidirectionally without sending the additional backward clock. This invention also discloses a scheme to tolerate jitters from the clock source. With this approach, this new interface can make a digital display an I/O concentrator.

12 Claims, 8 Drawing Sheets

METHOD AND APPARATUS FOR BIDIRECTIONAL DATA TRANSFER BETWEEN A DIGITAL DISPLAY AND A COMPUTER

RELATED APPLICATIONS

This application claims the benefit of U.S. Provisional Application No. 60/100,057 entitled "Methods and Apparatus for Bidirectional Data Transfer Between Digital Display Device and Computing Devices" which was filed on Sep. 10, 1998.

BACKGROUND OF THE INVENTION

1. Technical Field

This invention relates to data communication systems. More particularly, this invention relates to a method and apparatus for bidirectional data transfer between a digital display and a computer.

2. Description of the Related Art

In today's computing environment, the interface between a computer and a human is achieved by the interaction between a display and a human. Many I/O devices involved in a friendly user interface are connected together with a display for human interaction.

Existing cabling methods force all I/O devices connected to the computer itself with various kinds of cables and connectors, creating a difficulty with the cabling while occupying the space for the connectors. With an emerging digital data interface between a digital display and a computer, it is necessary to define a new signaling and cabling scheme which can ease all the cabling difficulties while saving the connector space.

Therefore, there is a need for a way to transfer all the necessary signals from various I/O devices to a computer by simply adding a backward channel interconnect via either a clock pair or by adding one more pair of data signals to the existing digital display interface.

SUMMARY OF THE INVENTION

Accordingly, it is the object of the present invention to provide a bidirectional data transfer between a digital display and a computer which doesn't require a backward clock.

This object is achieved in accordance with the present invention by providing a method and apparatus for bidirectional data transfer between a computer and a display connected through a cable having a first end at the computer and a second end at the display.

In a preferred embodiment, the apparatus includes a transmitter located at the computer for transmitting a pixel clock and forward data aligned to the pixel clock to the receiver in a forward channel, and a receiver located at the display for receiving the pixel clock and the data transmitted from the transmitter and for transmitting backward data to the transmitter in a backward channel. The transmitter further includes an oversampling circuit for generating a plurality of oversampling clocks for sampling the backward data received from the receiver, each clock being equally spaced in phase from its adjacent clock signal.

In an alternative embodiment, the apparatus includes a transmitter located at the computer and a receiver located at the display. The transmitter comprises a first unit-gain buffer for taking a pixel clock for transmitting data as an input and generating a voltage at the first end of the cable as an output, and a first subtractor for subtracting the pixel clock from the voltage at the first end of the cable to recover data received backward. The receiver comprises a second unit-gain buffer for taking backward data to be transmitted to the transmitter as an input and generating a voltage at the second end of the cable as an output, and a second subtractor for subtracting the backward data from the voltage at the second end of the cable to recover the pixel clock transmitted from the computer.

DESCRIPTION OF THE PREFERRED EMBODIMENT

1. Unidirectional Clocking for Bidirectional Data Transfer

Figure 1:
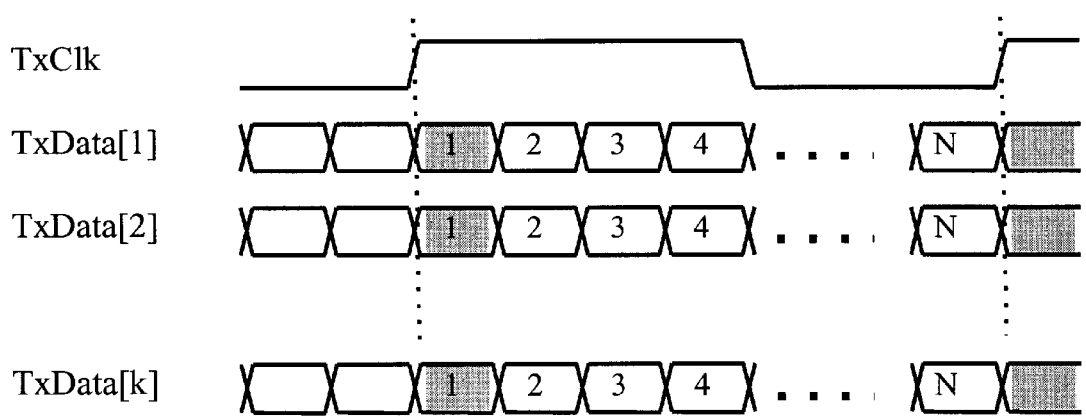
FIG. 1 is a timing diagram illustrating a conventional serial digital video data stream.

The present invention assumes serial digital data transfer between a digital display and a computer, such as the PanelLink™ interconnect system from Silicon Image, Inc. FIG. 1 shows an example of a conventional data transfer scheme. It illustrates the timing of a serial video data stream during data transfer. It uses a pixel clock, TxClk, and several transmitting data, TxData[k], to transfer a display refresh data stream. N bits of data are multiplexed into one pixel clock period after being serialized, where N is typically 8 to 10.

As user interface I/O devices, such as a mouse, a keyboard, a digital video camera, and audio devices (a speaker and a microphone), are attached to the display side, the need for data transfer from the display side to the computer side arises. The data transfer from the display side to the computer side will be hereinafter referred to as backward data transmission. In the case where backward data transmission is needed, the conventional clocking scheme, which finds sampling points from the relative relationship between a pixel clock and data, do not allow for the proper sampling of the backward data.

Figure 2:
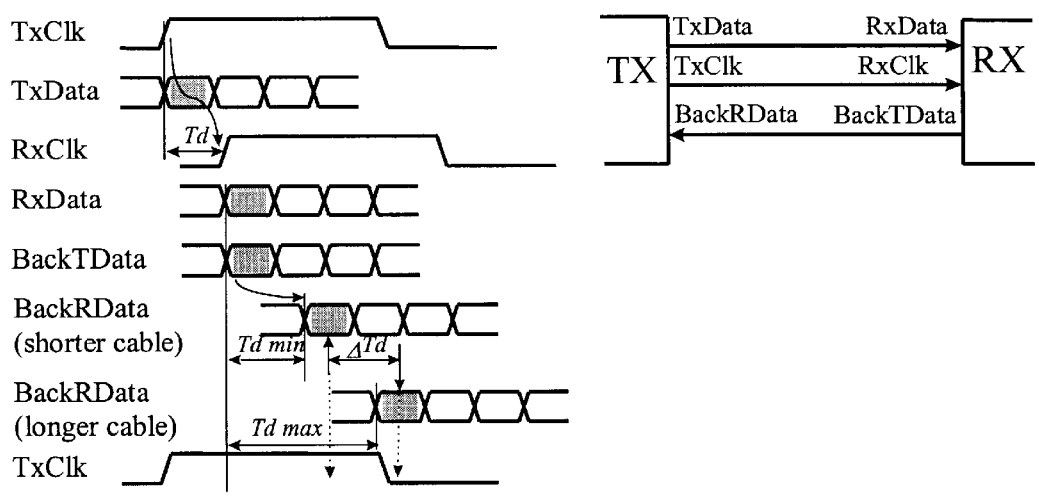
FIG. 2 is a diagram illustrating the problem with the conventional clocking scheme in bidirectional data transfer.

FIG. 2 illustrates the problem with the conventional clocking scheme in bidirectional data transfer. The transmitter, TX, transmits and a pixel clock, TxClk, and forward data, TxData, aligned to the pixel clock to the receiver, RX, through a cable. At the receiver side, the forward data received become RxData, and the pixel clock received becomes RxClk, after a propagation delay through the cable, Td.

When a display in the receiver side generates data, the receiver sends them as backward data, BackTData, aligned to RxClk to the transmitter. BackTData are received at the transmitter side as BackRData after a propagation delay through the cable. BackRdata are sampled using the pixel clock TxClk to recover data. The problem is that BackRData arrive at the transmitter side at different points in time, depending on the length of cable, since the propagation delay through the cable depends on the cable length.

FIG. 2 shows the propagation delay for a shorter cable, Td min, and the propagation delay for a longer cable, Td max. Sampling of the data received backward, BackRdata, using TxClk, which does not account for the propagation delay difference ΔTd, results in incorrect sampling. Unless a special technique is used, the conventional scheme cannot recover the data received backward correctly. Therefore, a backward clock is necessary for the backward sampling timing recovery in the conventional method.

Figure 3:
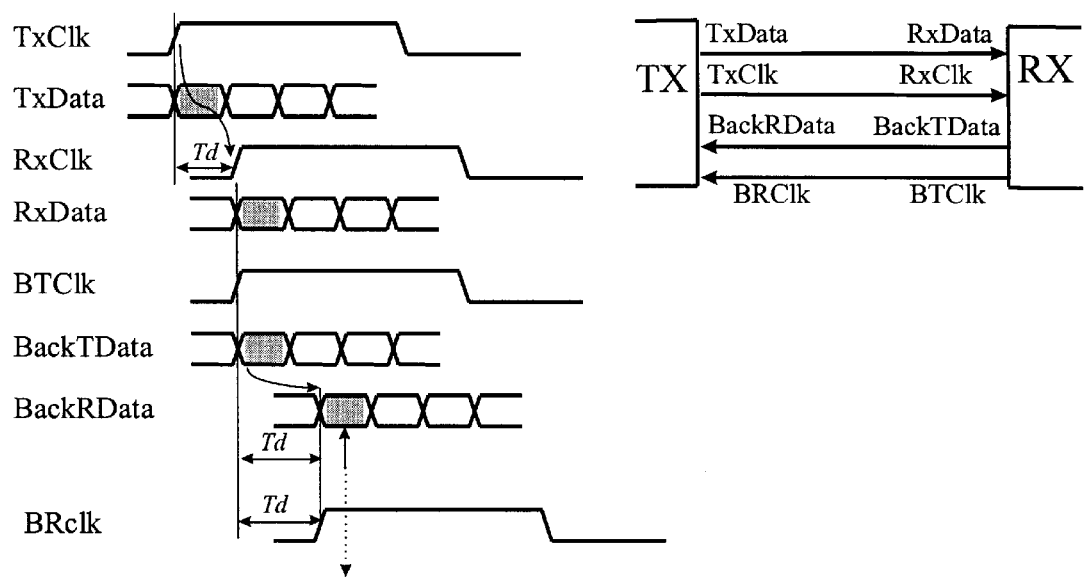
FIG. 3 is a diagram showing backward data transmission with a backward clock.

FIG. 3 shows backward data transmission with an added backward clock. Since the backward clock, BTClk, and the backward data, BackTData, travel the same length, they are delayed by the same propagation delay Td, maintaining the relative timing relationship.

However, when a backward clock is sent along with backward data, there are two drawbacks. First, additional pins and power related with routing the backward clock are required. Second, the computer side should have two different clocks with the same frequency, but with a different phase, creating an asynchronous boundary in a single system. This asynchronous boundary in the system on a chip can also make the chip design complex and difficult.

The clocking scheme according to a preferred embodiment of the present invention allows a single clock to be used for either from a computer to a display or from a display to a computer. Thus, the clock is used to deliver frequency information, rather than phase information.

Figure 4:
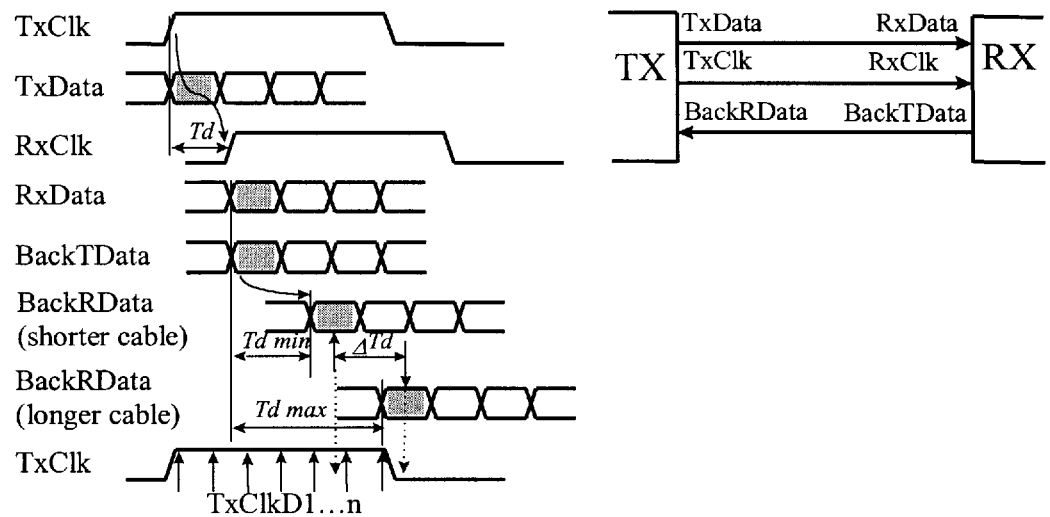
FIG. 4 is a diagram showing bidirectional data transfer with a unidirectional clock using oversampling.

FIG. 4 shows bidirectional data transfer with a unidirectional clock using oversampling according to the preferred embodiment. The oversampling technique is the main idea of the unidirectional clocking for bidirectional data transfer. The implementation of the oversampling technique is disclosed in detail in U.S. Pat. No. 5,905,769, which is incorporated herein by reference. Oversampling samples the received signal more than one time during the expected duration of each bit signal.

The oversampling technique is used at the transmitter, TX, of FIG. 4 for correct data recovery. As mentioned before, the timing relationship between clock and data should be within a specified range for correct sampling in the conventional systems. When a high-speed serial data stream is sampled, there is a limited correct sampling window within a bit time period. The best sampling point would be at the center position of each bit signal. But, if the sampling point is not at the center position, for example, near the bit transition edge, due to a propagation delay, the sampled data may not be correct. The use of the oversampling techniques selects multiple points within a bit time period to choose a correct sampling window.

Figure 5:
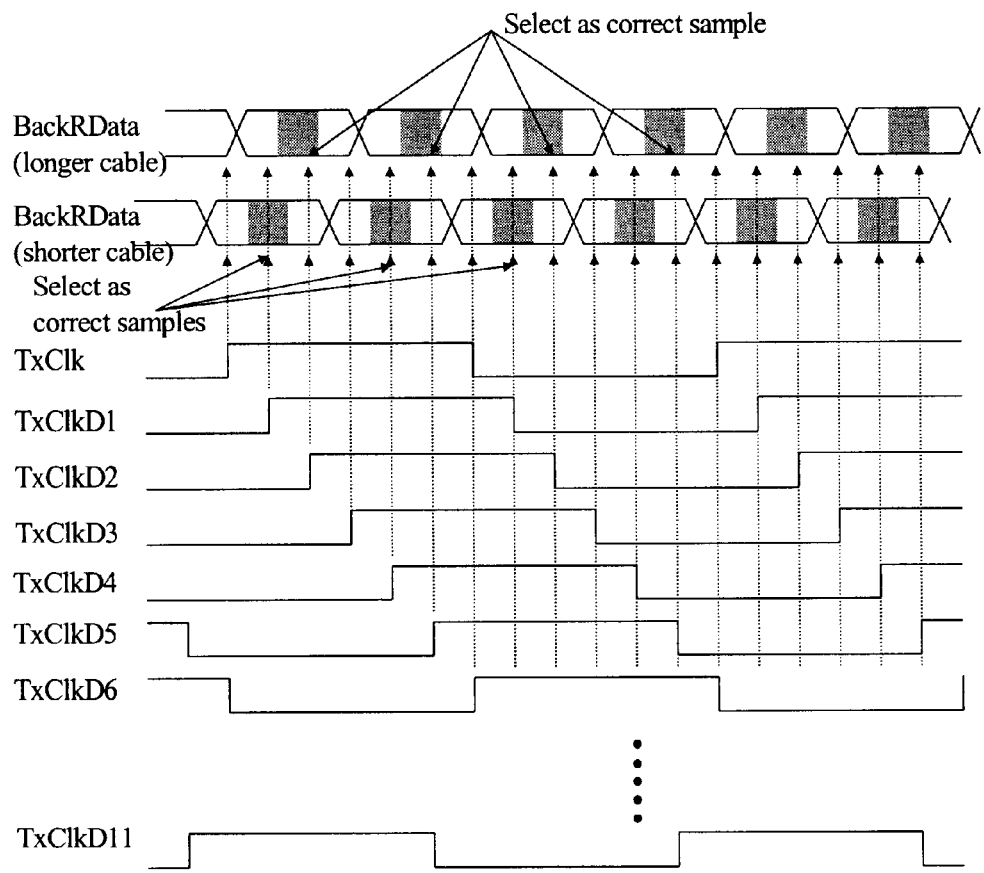
FIG. 5 is a timing diagram further illustrating the oversampling technique.

FIG. 5 further illustrates the use of the oversampling technique to overcome the problem. The serial data rate is four times the frequency of TxClk. Eleven additional oversampling clocks (from TxClkD1 to TxClkD11) are derived from the TxClk. One bit time is sampled three times using the oversampling clocks. There is a correct sampling window in one bit time. The correct sampling window in the BackRData stream is indicated as shaded regions. At least one clock out of the three oversampling clocks samples the correct sampling window of a bit. If data sampling relies only on the aligning of TxClk and BackRData, correct sampling cannot be achieved when the cable length varies.

TxClkD1, TxClkD4, TxClkD7, and TxClkD10 sample the correct sampling window for BackRData of a short cable. When the phase of BackRData changes due to a longer cable, the correct sampling clock changes to TxClkD2, TxClkD5, TxClkD8, and TxClkD11, as shown in FIG. 5. The correctly sampled data can be found by examining all the oversampled data.

Beside the advantages of reduced pins and power savings, there is another system-level advantage in that the system design can be simplified. Each side of the system works in a single clock domain. All of the circuits of System 1 of FIG. 4 are clocked by a single clock or by the derivatives of the system clock. All of the circuits of System 2 can also be clocked by the same system clock.

2. Full-duplex Scheme for a Clock and Backward Data

Figure 6:
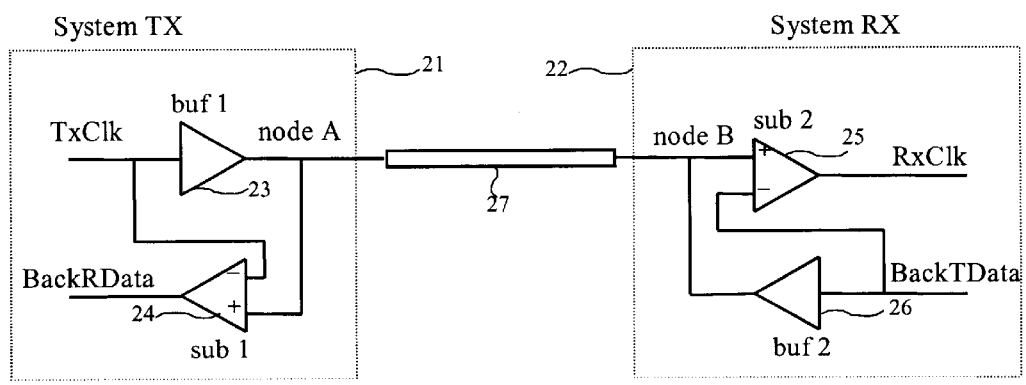
FIG. 6 is a diagram showing full-duplex data transfer.

To further reduce the number of cables and pins in bidirectional data transfer, backward data can be superimposed onto a clock line. FIG. 6 shows an alternative embodiment for full duplex data transfer with a pixel clock, TxClk, and the backward data, BackTData, where 'buf' denotes a unit-gain buffer and 'sub' denotes a subtractor. System TX 21 sends the pixel clock for transmitting data, TxClk, to System RX through a cable 27 after passing through a first buffer 23. Since only one cable 27 is used, the voltage at node A is the sum of TxClk and BackTData received through the cable System RX 22. System TX recovers BackRData by subtracting TxClk from the node A voltage by using a first subtractor 24.

System RX 22 sends the backward data, BackTData, to System TX after passing through a second unit-gain buffer 26. Since only one cable is used, the voltage at node B contains both TxClk received through the cable and data to be transmitted backwards, BackTdata. System RX recovers RxClk by subtracting BackTData from the node B voltage using a second subtractor 25.

3. Display Data Buffering Scheme for Tolerating Clock Source Jitter

The pixel clock for a display usually comes from a graphics controller chip. Since the clock is synthesized from an internal PLL of the graphics controller chip, the jitter characteristic of the clock varies depending on the frequency and chip vendors. The jitter from the clock source can degrade the performance of the serial data link because all the circuitry in the link is directly affected by the jitter of the clock source. In one embodiment of the present invention, a FIFO (first-in-first-out) is used for the display data to tolerate the jitter of the clock source.

Figure 7:
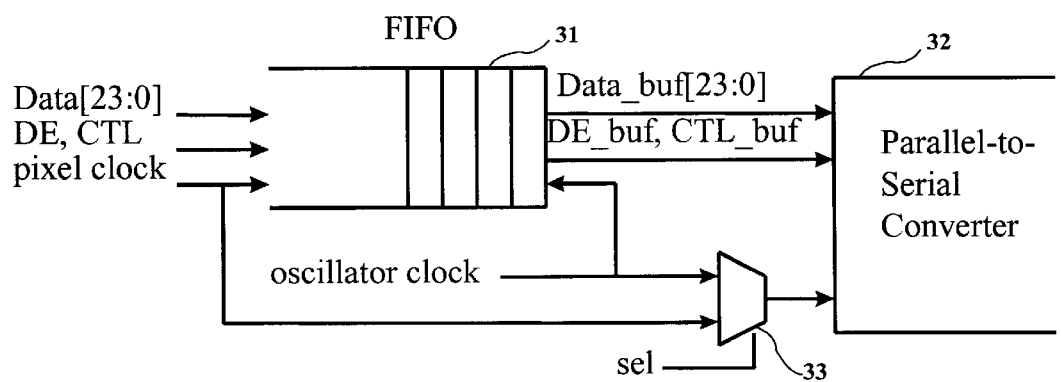
FIG. 7 is a diagram showing a display data FIFO for tolerating a clock source jitter.

FIG. 7 shows the block diagram of a system for absorbing the jitter. The parallel display data, data[23:0], as well as the Data Enable (DE) signal and the control signal (CTL) from the graphics controller (not shown) become an input to a FIFO 31 and the output data from the. FIFO become an input to a parallel-to-serial converter 32. The clock that is used for the output of the FIFO comes from an external oscillator clock. A selector 33 switches the clock used for the parallel-to-serial converter between the external oscillator clock and the pixel clock from the graphics controller.

The frequency of the external oscillator needs to be close to that of the pixel clock with much less jitter than the clock generated from other ICs. All other parts except the FIFO input are clocked by the external oscillator clock. Even if there is a large amount of jitter in the pixel clock from the graphics controller, the rest of the chip operates with the clean and jitter free external oscillator. The result is a complete tolerance to the input clock jitter. The allowed frequency difference between the pixel clock and the oscillator depends on the size of the FIFO. A larger FIFO can handle a larger frequency difference.

4. I/O Data Mutiplexing Into a Backward Channel

As many I/O devices become attached at the display side, the various data formats of individual devices make it difficult to transfer all the data in a single backward data channel. The present invention uses a simple slot assignment technique to solve this problem.

Since the bandwidth requirement needed by typical I/O devices are fixed, it is reasonable to pre-assign some bandwidth to predetermined I/O devices such as a mouse, a keyboard, and a digital video device. The remaining slots can be identified with a header indicating the owner of the data stream.

Figure 8:
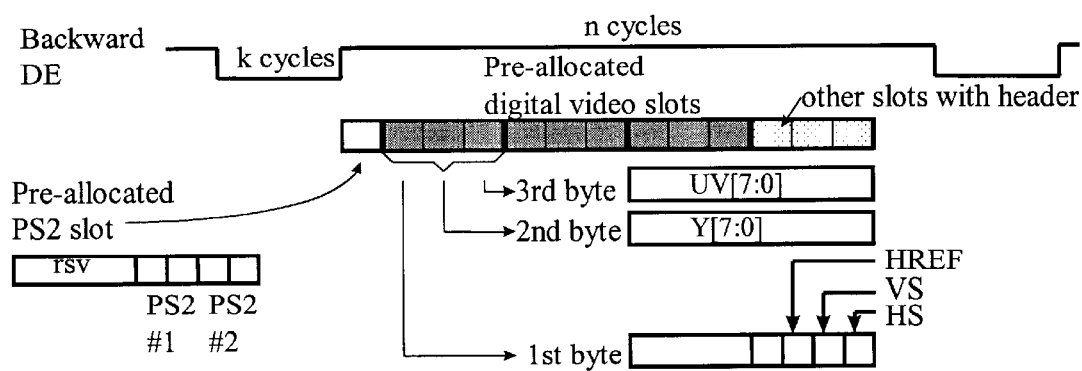
FIG. 8 is an illustration showing an example of backward channel I/O data multiplexing.

FIG. 8 illustrates an example of bandwidth allocation in accordance with the present invention. The backward data channel uses k cycles of the DataEnable low (DE-low) period and n cycles of the DE-high period, where data are transferred during the DE-high period. For example, PS2 slots may be provided for keyboard information, and digital video slots may be provided for video information.

Forward channels can also integrate I/O data stream, besides the display refresh data by inserting the I/O data stream during the blanking period. A set of special characters, which are out-of-band characters used for blanking period for synchronization, can be used to separate different I/O data stream as well as I/O data. Two special characters may be required to represent the binary I/O data.

While the invention has been described with reference to preferred embodiments, it is not intended to be limited to those embodiments. It will be appreciated by those of ordinary skill in the art that many modifications can be made to the structure and form of the described embodiments without departing from the spirit and scope of the invention, which is defined and limited only in the following claims.

What is claimed is:

1. An apparatus for bidirectional data transfer between a computer and a display connected through cables having a first end at the computer and a second end at the display, the apparatus comprising:
   a transmitter located at the computer for transmitting a pixel clock and forward data aligned to the pixel clock to the receiver in a forward channel;
   a receiver located at the display for receiving the pixel clock and the forward data from the transmitter, and for transmitting backward data to the transmitter in a backward channel, wherein the transmitter further comprises an oversampling circuit for generating a plurality of oversampling clocks for sampling the backward data received from the receiver, each clock being equally spaced in phase from its adjacent clock;
   a graphics controller for generating display data and a jittered clock;
   a FIFO having an input clocked by the jittered clock of the graphics controller and an output clocked by a clean oscillator clock for generating buffered display data as an output; and a parallel-to-serial converter for taking the buffered display data as an input and for generating said forward data as an output.

2. The apparatus of claim 1, wherein said backward channel is divided into slots, and part of the slots are pre-assigned to data generated from a predetermined I/O device.

3. The apparatus of claim 2, wherein the predetermined I/O device is a keyboard.

4. The apparatus of claim 2, wherein the predetermined I/O device is a digital video device.

5. An apparatus for bidirectional data transfer between a computer and a display connected through a cable having a first end at the computer and a second end at the display, the apparatus comprising:
   a transmitter located at the computer, further comprising:
      a first unit-gain buffer for taking a pixel clock for transmitting data as an input and generating a voltage at the first end of the cable as an output; and a first subtractor for subtracting the pixel clock from the voltage at the first end of the cable to recover backward data received from the receiver;
   and a receiver located at the display, further comprising:
      a first unit-gain buffer for taking backward data to be transmitted to the transmitter in a backward channel as an input and generating a voltage at the second end of the cable as an output;
      a second subtractor for subtracting the backward data from the voltage at the second end of the cable to recover the pixel clock transmitted from the computer;
      a graphics controller for generating display data and a jittered clock;
      a FIFO having an input clocked by the jittered clock of the graphics controller and an output clocked by a clean oscillator clock for generating buffered display data as an output; and
      a parallel-to-serial converter for taking the buffered display data as an input and for generating said backward data to be transmitted to the transmitter as an output.

6. The apparatus of claim 5, wherein said backward channel is divided into slots, and part of the slots are pre-assigned to data generated from a predetermined I/O device.

7. The apparatus of claim 6, wherein the predetermined I/O device is a keyboard.

8. The apparatus of claim 6, wherein the predetermined I/O device is a digital video device.

9. A method of bidirectional data transfer between a computer and a display connected through a cable having a first end at the computer and a second end at the display, the method comprising:
   transmitting a pixel clock from the computer to the display after processing through a unit-gain buffer;
   subtracting the pixel clock from a voltage at the first end of the cable to recover data received backward from the receiver;
   transmitting backward data from the display to the computer after processing through a unit-gain buffer in a backward channel; and
   subtracting the backward data from a voltage at the second end of the cable to recover the pixel clock transmitted from the transmitter.

10. The method of claim 9, wherein the step of transmitting backward data further comprises the steps of:
    dividing the backward channel into slots; and
    pre-assigning part of the slots to data generated from a predetermined I/O device.

11. The method of claim 10, wherein the predetermined I/O device is a keyboard.

12. The method of claim 10, wherein the predetermined I/O device is a digital video device.

* * * * *